(12) United States Patent
Abedini et al.

(10) Patent No.: US 10,586,330 B2
(45) Date of Patent: Mar. 10, 2020

(54) DETECTION OF OUTLIER LESIONS BASED ON EXTRACTED FEATURES FROM SKIN IMAGES

(71) Applicants: International Business Machines Corporation, Armonk, NY (US); MoleMap NZ Ltd., Auckland (NZ)

(72) Inventors: Mani Abedini, Pascoe Vale (AU); Adrian Bowling, Auckland (NZ); Rajib Chakravorty, Epping (AU); Sergey Demyanov, Melbourne (AU); Rahil Garnavi, Macleod (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/247,798

(22) Filed: Jan. 15, 2019

(65) Prior Publication Data

US 2019/0147594 A1    May 16, 2019

Related U.S. Application Data

(63) Continuation of application No. 15/336,293, filed on Oct. 27, 2016.

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/4642* (2013.01); *G06K 9/6212* (2013.01); *G06T 7/0016* (2013.01); *G06T 7/73* (2017.01); *G06K 2209/05* (2013.01); *G06T 2207/10016* (2013.01); *G06T 2207/10024* (2013.01);
(Continued)

(58) Field of Classification Search
None
See application file for complete search history.

(56) References Cited

U.S. PATENT DOCUMENTS 6,075,879 A  *  6/2000  Roehrig ............... G06F 19/321
                                                        382/132
6,345,275 B2     2/2002  Lee
(Continued)

FOREIGN PATENT DOCUMENTS

WO          2005060466 A2      7/2005

OTHER PUBLICATIONS melanoma.org, "Melanoma Facts and Statistics," http://www.melanoma.org.au/understanding-melanoma/melanoma-facts-and-statistics/, 2016, 2 pages.
(Continued)

*Primary Examiner* — Stephen P Coleman
(74) *Attorney, Agent, or Firm* — Joseph Petrokaitis; Ryan, Mason & Lewis, LLP

(57) ABSTRACT

A method for image analysis comprises receiving one or more images of a plurality of lesions captured from a body of a person, extracting one or more features of the plurality of lesions from the one or more images, analyzing the extracted one or more features, wherein the analyzing comprises determining a distance between at least two lesions with respect to the extracted one or more features, and determining whether any of the plurality of lesions is an outlier based on the analyzing.

19 Claims, 11 Drawing Sheets

(51) Int. Cl.
G06K 9/46 (2006.01)
G06K 9/62 (2006.01)
G06T 7/73 (2017.01)

(52) U.S. Cl.
CPC .............. *G06T 2207/20081* (2013.01); *G06T 2207/30088* (2013.01); *G06T 2207/30096* (2013.01)

(56) References Cited

U.S. PATENT DOCUMENTS

| | | | |
|---|---|---|---|
| 6,993,167 | B1 | 1/2006 | Skladnev et al. |
| 7,415,143 | B2 | 8/2008 | Grichnik |
| 7,457,659 | B2 | 11/2008 | Maschke |
| 7,539,334 | B2 | 5/2009 | Corrion |
| 8,837,796 | B1 | 9/2014 | Zalutskaya |
| 9,089,303 | B2 | 7/2015 | Chen et al. |
| 9,092,697 | B2 | 7/2015 | Manson et al. |
| 2005/0228264 | A1 | 10/2005 | Grichnik |
| 2007/0053561 | A1 | 3/2007 | Corrion |
| 2007/0100226 | A1* | 5/2007 | Yankelevitz ......... A61B 5/1075 600/407 |
| 2007/0177786 | A1* | 8/2007 | Bartels ............... G06K 9/00127 382/133 |
| 2007/0208263 | A1 | 9/2007 | John et al. |
| 2011/0123087 | A1* | 5/2011 | Nie ........................ G06T 7/62 382/132 |
| 2011/0129129 | A1 | 6/2011 | Avinash et al. |
| 2011/0218428 | A1 | 9/2011 | Westmoreland et al. |
| 2011/0237938 | A1 | 9/2011 | Mizuno |
| 2011/0273535 | A1 | 11/2011 | Mendelson |
| 2012/0008838 | A1 | 1/2012 | Guyon et al. |
| 2014/0016845 | A1* | 1/2014 | Gazit ..................... A61B 5/055 382/130 |
| 2014/0142413 | A1* | 5/2014 | Chang ................... G16H 50/20 600/407 |
| 2015/0205998 | A1 | 7/2015 | Suh et al. |
| 2015/0302270 | A1* | 10/2015 | BenHimane ............ G06F 16/56 382/197 |
| 2015/0342560 | A1* | 12/2015 | Davey .................... A61B 8/085 600/443 |
| 2016/0157787 | A1* | 6/2016 | Merritt ................. A61B 5/7271 600/486 |
| 2016/0364529 | A1 | 12/2016 | Li et al. |
| 2017/0061621 | A1 | 3/2017 | Wortman |
| 2017/0076451 | A1 | 3/2017 | Pauly |
| 2018/0075597 | A1 | 3/2018 | Zhou et al. |
| 2018/0103932 | A1 | 4/2018 | Tahmasebi et al. |

OTHER PUBLICATIONS skincancer.org, "Skin Cancer Facts & Statistics," http://www.skincancer.org/skin-cancer-information/skin-cancer-facts#treatment, Jun. 8, 2016, 6 pages.

A. Scope et al., "The 'Ugly Duckling' Sign: Agreement Between Observers," Journal of Archives of Dermatology, Jan. 2008, pp. 58-64, vol. 144, No. 1.

I, Maglogiannis et al., "Overview of Advanced Computer Vision Systems for Skin Lesions Characterization," IEEE Transactions on Information Technology in Biomedicine, Sep. 2009, pp. 721-733, vol. 13, No. 5.

L.W.C. Chan et al., "Machine Learning of Patient Similarity," IEEE International Conference on Bioinformatics and Biomedicine Workshops, 2010, pp. 467-470.

C.A. Morton et al., "Clinical Accuracy of the Diagnosis of Cutaneous Malignant Melanoma," British Journal of Dermatology, Feb. 1998, pp. 283-287, vol. 138, No. 2.

J.J. Grob et al., "The 'Ugly Duckling' Sign: Identification of the Common Characteristics of Nevi in an Individual as a Basis for Melanoma Screening," Journal of Archives of Dermatology, Jan. 1998, pp. 103-104, vol. 134, No. 1.

List of IBM Patents or Patent Applications Treated as Related.

* cited by examiner

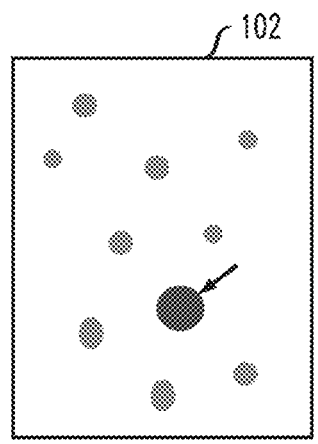
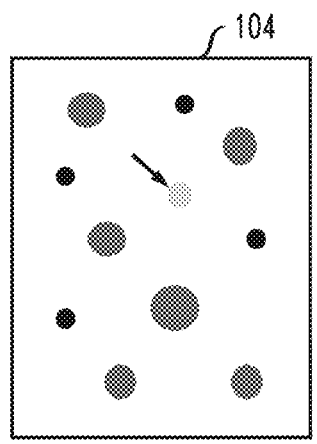
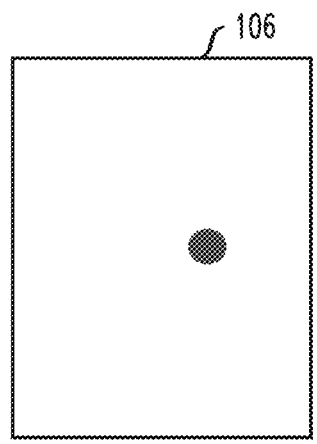
FIG. 1A  FIG. 1B  FIG. 1C
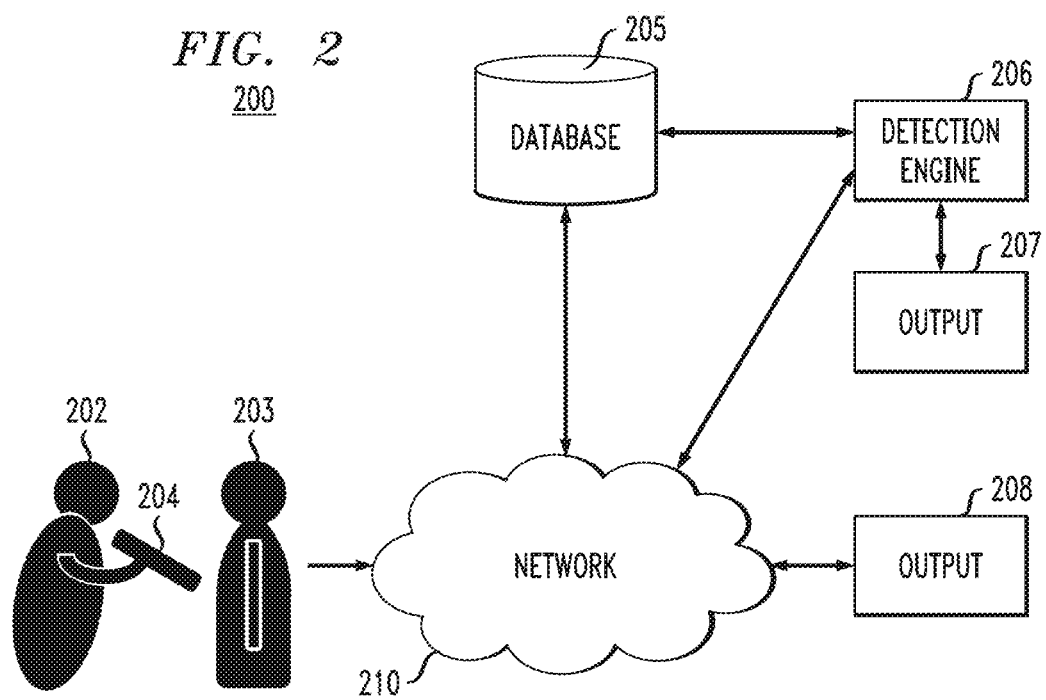
FIG. 2

800

900

DETECTION OF OUTLIER LESIONS BASED ON EXTRACTED FEATURES FROM SKIN IMAGES

BACKGROUND

Melanoma is one of the most common cancers in Australian and United States populations. In the United States, 76,380 new cases of invasive melanoma are estimated to be diagnosed in 2016. In 2016, it is estimated that 10,130 people die of melanoma. The annual cost of treating melanoma is estimated as $3.3 billion. Therefore, besides being fatal, melanoma can affect multiple stages of a societal fabric.

While melanoma can be a fatal disease, it can be treated fully when detected early, by for example, an excisional biopsy. Typically, early detection of melanoma in a skin mole or other lesion is assessed by the presence/absence of certain features in the mole or other lesion. These examinations are usually formed as defined protocols used by health care professionals. There exist several such protocols such as, for example, "ABCD Rule", "Menzies Rule", "3 point checklist", etc. Common features across these different protocols can include the presence of certain "colors" (brown, black, red, etc.) and/or patterns (networks, globules, etc.). When examined under dermoscopy or other clinical imagery, health care professionals look for signatures and assign a score to the mole or other lesion. The decision to perform a biopsy occurs if the score exceeds a predefined threshold, the value of which may vary depending on rules and/or protocols.

Though the use of dermoscopy or other clinical imagery enhances sensitivity of disease detection, diagnosis of a skin lesion is not trivial, even for health care professionals. However, as the understanding of skin lesion physiology grew over time, researchers found new insights for early detection of melanoma. One of these insights is the concept of "ugly duckling", which was introduced in Grob J J et al., "The *Ugly Duckling' Sign: Identification Of The Common Characteristics Of Nevi In An Individual As A Basis For Melanoma Screening.*" Arch Dermatol 1998; 134(1):103-104 The core idea behind the ugly duckling concept is that each mole or lesion should be examined not by itself, but with other moles or lesions in the surrounding area. For example, the presence or absence of a signature could be considered significant in detecting melanoma if the same signature is respectively absent or present in the surrounding moles or lesions.

Evidence is emerging that the ugly duckling method is very effective to identify potentially melanocytic lesions. Studies among dermatologists, nurses and non-clinicians have indicated that practitioners believe that ugly duckling methodology can be very useful to identify potential melanoma lesions.

SUMMARY

According to an exemplary embodiment of the present invention, a method for image analysis comprises receiving one or more images of a plurality of lesions captured from a body of a person, extracting one or more features of the plurality of lesions from the one or more images, analyzing the extracted one or more features, wherein the analyzing comprises determining a distance between at least two lesions with respect to the extracted one or more features, and determining whether any of the plurality of lesions is an outlier based on the analyzing.

According to an exemplary embodiment of the present invention, a system for image analysis comprises a memory and at least one processor coupled to the memory, wherein the at least one processor is configured to receive one or more images of a plurality of lesions captured from a body of a person, extract one or more features of the plurality of lesions from the one or more images, analyze the extracted one or more features, wherein the analyzing comprises determining a distance between at least two lesions with respect to the extracted one or more features, and determine whether any of the plurality of lesions is an outlier based on the analyzing.

According to an exemplary embodiment of the present invention, a computer program product for image analysis comprises a computer readable storage medium having program instructions embodied therewith, the program instructions executable by a processor to cause the processor to perform a method comprising receiving one or more images of a plurality of lesions captured from a body of a person, extracting one or more features of the plurality of lesions from the one or more images, analyzing the extracted one or more features, wherein the analyzing comprises determining a distance between at least two lesions with respect to the extracted one or more features, and determining whether any of the plurality of lesions is an outlier based on the analyzing.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIGS. 1A, 1B and 1C illustrate diagrams for explaining outlier lesions.

FIG. 2 is block diagram illustrating a system for identifying an outlier lesion, according to an exemplary embodiment of the present invention.

DETAILED DESCRIPTION

Figure 3:
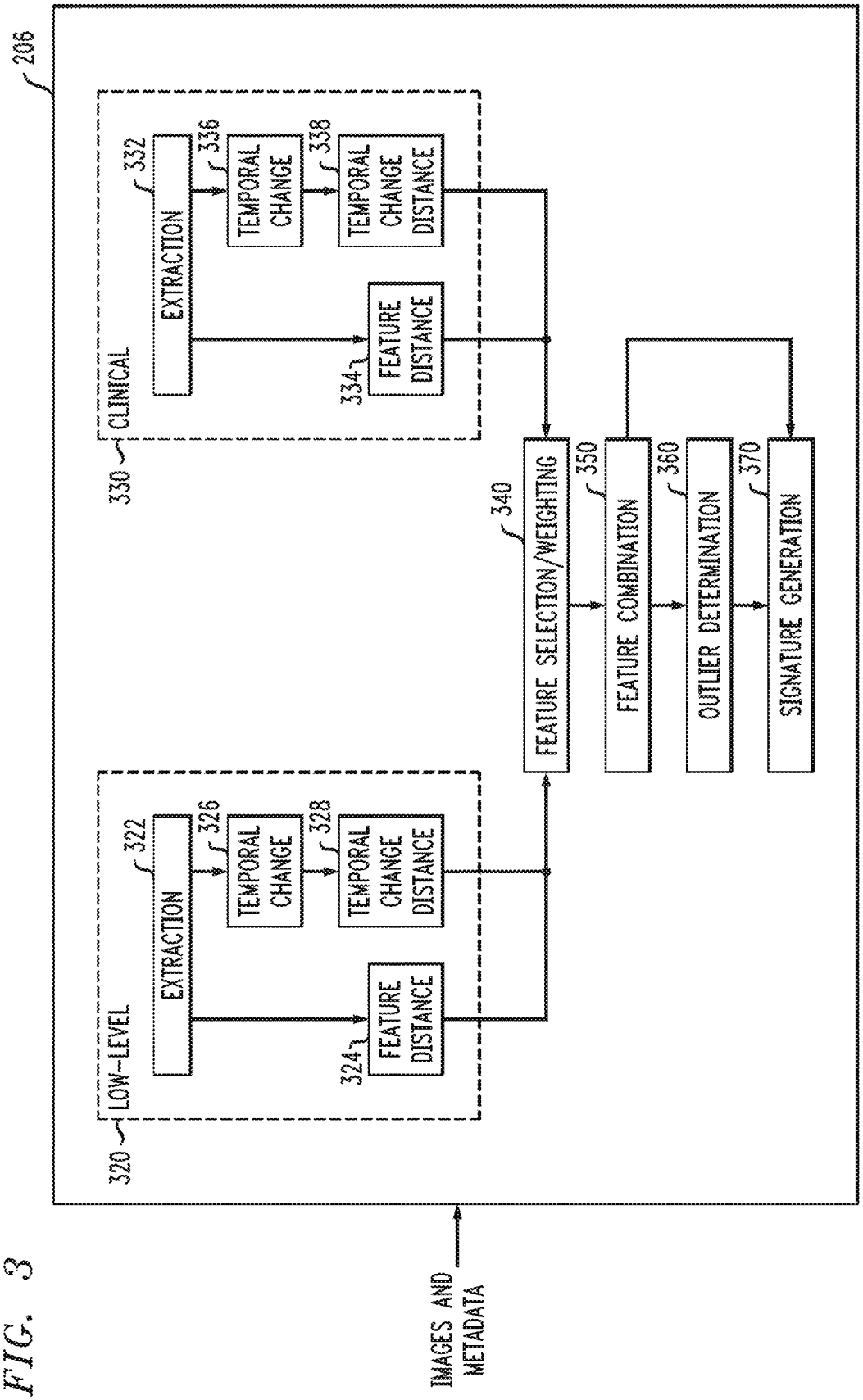
FIG. 3 is a block diagram illustrating a detection engine in a system for identifying an outlier lesion, according to an exemplary embodiment of the present invention.

Exemplary embodiments of the invention will now be discussed in further detail with regard to image analysis and, in particular, to lesion image analysis to detect outlier lesions from a plurality of lesions on a patient. This invention may, however, be embodied in many different forms and should not be construed as limited to the embodiments set forth herein.

Embodiments of the present invention relate to systems and methods which use skin imagery to calculate distances among groups of lesions based on, for example, feature differences between the lesions in a particular area on the body. The systems and methods, in accordance with embodiments of the present invention, are used to identify moles or other lesions which are distinct from a group of moles or other lesions (e.g., ugly ducklings) and thereby assist in early classification of cancerous moles or other lesions by both expert and non-expert users. Moreover, the embodiments of the present invention can be also be used to search for similar lesions across multiple patients as a part of a decision support system for health care professionals.

Embodiments of the present invention relate to systems and methods to identify one or more images of a different or dissimilar lesion(s) from one or more images of multiple lesions for the same individual, where a difference metric considers feature importance and spatial location of individual lesions. The images that are analyzed can be obtained, using, for example, dermoscopy, clinical imaging techniques, or other modalities or combination of modalities. The difference or dissimilarity can be based on raw images (e.g., pixel based), relevant features present within the lesion as defined by domain experts, temporal changes of the lesions or any combination thereof. The difference or dissimilarity can be calculated based on all lesions from the entire body or within a specific portion of the body.

Embodiments of the present invention also provide for updating as images of new lesions become available, development of one or more lesion signatures for individual patients, and searching for similar signatures across multiple patients.

Referring to FIG. 1A, an outlier lesion (e.g., ugly duckling) can have, for example, a different color and different size than neighboring lesions. Referring to FIG. 1B, an outlier lesion can have, for example, a different color than one or more colors of neighboring lesions. Referring to FIG. 1C, an outlier lesion can be far apart from other lesions on the body of a patient, so that there are no lesions near the outlier lesion.

FIG. 2 is block diagram illustrating a system for identifying an outlier lesion, according to an exemplary embodiment of the present invention. As shown in FIG. 2 by lines and/or arrows, the components of the system 200 are operatively connected to each other via, for example, physical connections, such as wired and/or direct electrical contact connections, and/or wireless connections, such as, for example, WiFi, BLUETOOTH, IEEE 802.11, and/or networks, including but not limited to, a local area network (LAN), wide area network (WAN), cellular network, ad hoc networks, WANET, satellite network or the Internet. For example, a network 210 can operatively link components 204, 205, 206, 207 and 208 of the system 200.

By way of non-limiting example, in accordance with an embodiment of the present invention, referring to FIG. 2, the system includes at least one capture device 204 that is used by, for example, a practitioner 202, such as a doctor, nurse, physician's assistant, technician, etc., to capture images of any lesions and/or groups of lesions from a patient 203. The capture device 204 can include, but is not necessarily limited to, a camera, such as a still picture or video camera, scanner, specialized imaging device, tablet, and/or smart mobile device, such as a smart phone or tablet that can, for example, take a picture or perform a full body or partial body scan of a patient 203. The capture device 204 can be further used to receive meta data inputs and/or sense meta data, the meta data including, for example, patient information, history, age, skin tone, and/or location on the body of respective lesions or groups of lesions. The capture device 204 can be configured to communicate wirelessly with the other components 205-208 of the system 200 over the network 210.

The database 205 stores the meta data and images of lesions and/or groups of lesions that have been taken from a patient 203 over a period of time. For example, the database 205 may store historical patient information and images and data concerning the images that have been obtained at previous appointments over a predetermined time period (e.g., 10 years, 5 years, etc.). The data from the database 205 is electronically accessible by a detection engine 206, for example, via the network 210 or directly, and is used by the detection engine 206 when determining outlier ugly duckling) lesions. The database 205 is also configured to receive images and meta data from the capture device 204 via network 210 or directly. The lesion images produced in accordance with embodiments of the present invention include, but are not necessarily limited to, dermoscopy, sonography, confocal microscopy, multiphoton tomography, or optical coherence tomography images.

The system 200 further includes the detection engine 206, which identifies outlier lesions and creates patient signatures based on the results of the analysis being performed by the detection engine 206. The detection engine 206 provides results to one or more output devices 207 and 208 either directly or via a network 210 so that a user, such as, for example, a practitioner 202 or other medical personnel, can view the determinations made by the detection engine 206 and decide on a treatment protocol for a patient 203. The output devices 207 and 208, can include, for example, a desktop or portable computer, tablet, personal digital assistant (PIM), smart phone or other computing device having an interface for viewing the results. According to an embodiment, the results can be transmitted to the capture device 204, which can also function as an output device. The detection engine 206 also transmits analysis results to the database 205, so that the database 205 can electronically store, and the detection engine 206 can electronically access these results from the database 205 when performing subsequent analyses as explained in more detail herein. The detection engine 206 is explained in further detail herein in connection with FIG. 3.

FIG. 3 is a block diagram illustrating the detection engine 206, according to an exemplary embodiment of the present invention. Referring to FIG. 3, the detection engine 206 includes a low-level feature extraction module 320 and a clinical feature extraction module 330. The low-level feature extraction module 320 performs image processing and analysis to extract visual features from lesion images captured by the capture device 204, producing, for example, histograms, such as texture histograms, which provide a representation of the distribution of texture in the lesion images, and color histograms, which provide a representation of the distribution of colors in the lesion images, showing a proportion of the number of different types of colors. A color histogram can illustrate a statistical distribution of colors and a tone of an image. For digital images, a color histogram may represent the number of pixels that have colors in each of a fixed list of color ranges. In accordance with a non-limiting embodiment of the present invention, the low-level feature extraction module 320 is configured to extract visual features, such as texture and color distribution, which are not detectable or discernable by the human eye.

The clinical feature extraction module 330 performs image processing and analysis to extract clinical features from lesion images. The clinical features include, but are not necessarily limited to, size of lesions, shape (e.g., contour) of lesions, symmetry/asymmetry of the lesions, nature of boundaries at edges of the lesions (e.g., abrupt, gradual), and/or color of the lesion (e.g., brown, black, yellow or gray). The clinical feature extraction module 330 analyzes the extracted clinical features to determine whether, based on medical knowledge and/or the results of previous analyses, the extracted features of a lesion image indicate that the lesion may be an outlier. The analysis can also be based on meta data associated the lesion images including, for example, patient information, history, and/or location on the body of respective lesions or groups of lesions. In accordance with a non-limiting embodiment of the present invention, the clinical feature extraction module 330 is configured to extract clinical features, such as size, symmetry/asymmetry, nature of boundaries and colors which are not detectable or discernable by the human eye.

Lesion images processed through the low-level and clinical feature extraction modules 320, 330 include individual lesions or groups of lesions taken from a body of a patient, or which are present in the database 205. In accordance with an embodiment of the present invention, features of a set of lesions from the same individual are extracted from an image. As noted, features can be low-level image features, such as, but not necessarily limited to, color histograms, local binary patterns etc., clinical features, such as, but not necessarily limited to, dermoscopic patterns, color, lesion asymmetry, etc. In addition, as discussed further herein, temporal characteristics, such as, but not necessarily limited to, growth rate, changes in anatomical characteristic of a lesion, appearance of dermoscopy features, features density, etc., are also factored into the determination of whether a lesion is an outlier.

Each of the low-level feature extraction module 320 and clinical feature extraction module 330 includes an extraction component 322, 332, a feature distance component 324, 334, a temporal change component 326, 336 and a temporal change distance component 328, 338. The extraction component 322 of the low-level feature extraction module 320 extracts one or more low-level features for each lesion image at a present time T and at one or more past times T-1, T-2 . . . T-n, where n represents an integer indicating a descending order of times when images were captured from close to the present time T to further removed from the present time T. The extraction component 332 of the clinical feature extraction module 330 extracts one or more clinical features for each lesion image at a present e T and at one or more past times T-1, T-2 . . . T-n.

The temporal change components 326 and 336 of each extraction module 320 and 330 determine temporal changes for each lesion or group of lesions between times (e.g., and T-1, T-1 and T-2). For example, low-level features (e.g., a distribution of colors) and clinical features (e.g., size, shape, symmetry/asymmetry, boundaries, color) of a lesion or group of lesions can change over time, and patterns can be identified from temporal feature changes that may lead to the conclusion that an undesirable skin condition has developed. In accordance with a non-limiting embodiment of the present invention, the temporal change components 326 and 336 are configured to determine temporal changes in low-level and clinical features which are not detectable or discernable by the human eye.

The temporal change distance components 328 and 338 of each extraction module 320 and 330 determine distance between the temporal changes determined by their corresponding temporal change modules 326, 336. For example, distances between the features for images at different times are determined pairwise. In other words, the changes in features between each pair of a first image taken at a first time and a second image taken at a second time are quantified as pairwise distances by the temporal change distance components 328 and 338. The temporal change distance component 328 determines pairwise distances between temporal changes in connection with the low-level features, and the temporal change distance component 338 determines pairwise distances between temporal changes in connection with the clinical features.

Each of the extraction modules 320 and 330 also include respective feature distance components 324 and 334, which determine distance between features for pairs of lesions taken at a particular time. In other words, the differences in features between each pair of a first lesion and a second lesion taken at a particular time are quantified as pairwise distances by the feature distance components 324 and 334. The feature distance component 324 determines pairwise distances between low-level features, and the feature distance component 334 determines pairwise distances between clinical features.

Distances between any two lesions in a specific feature space can be calculated as follows in equation (1):

$$d\_\{m,n\}_f = \text{distance}(v\_\{m\}_f, v\_\{n\}_n) \qquad (1)$$

where $d\_\{m,n\}_f$ denotes the distance of feature f collected from m-th and n-th lesions and distance( ) is a suitable function to calculate the distance. Examples of distance functions include, but are not necessarily limited to, Euclidean distance for vector features), Kullback-Leibler (KL) divergence measure (for histogram features), etc. By definition, $d\_\{m,m\}=0$.

Optionally, these distances can be normalized as follows in equation (2):

$$dn\_\{m,n\}_f = d\_\{m,n\}_f / \max(d\_\{m,n\}_f) \qquad (2)$$

$d\_\{m,n\}_f$ and $dn\_\{m,n\}_f$ may be used interchangeably herein.

While the embodiments of the present invention are discussed in connection with pairwise distance, other methods for calculating distance can be used, such as, for example, graph based clustering methods, including, but not necessarily limited to, spectral clustering and normalized cut clustering for identifying similar cases and grouping them together. Additionally, the function which calculates distance can be trainable, which generally means training a system/classifier to minimize the distance between similar cases and maximize the distance between non-similar cases by learning associated weights.

The detection engine 206 further includes a feature selection/weighting component 340, which, according to an embodiment of the present invention, receives the results of the distance calculations from the low-level and clinical feature extraction modules 320 and 330, and selects and/or assigns higher weights to particular features over other features based on their importance for determining outlier lesions. For example, given a certain set of circumstances, a feature such as asymmetry may be weighted higher than color, or clinical features in general may be weighted higher than low-level features. The circumstances affecting how weights are assigned and/or what features are selected, can be based on, for example, ethnic group, age, gender, family history, personal medical history, etc. According to an embodiment, weights to be assigned can be determined from machine learning using, for example, previous lesion studies and their results. Alternatively, weights can be assigned and input by users based on their understanding of a particular patient and/or condition. For example, weights can be pre-determined by experts based on the importance of a feature in relation to a disease/ailment in question. In a non-limiting example, "orientation difference" may be considered more important than "size difference" for a given set of circumstances. This may captured by an "importance weight" as below in equation (3), where each distance $d\_\{m,n\}_f$ is weighted for importance:

$$id\_\{m,n\}_f = w_{\{i,f\}} * d\_\{m,n\}_f \quad (3)$$

where $w_{\{i,f\}}$ denotes the weight due to importance of the feature.

Figure 6:
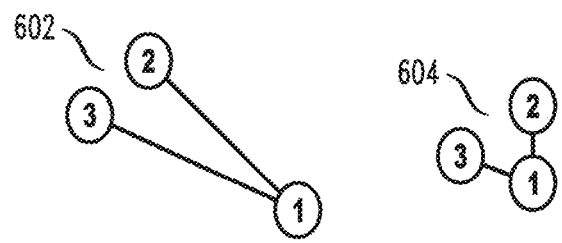
FIG. 6 is a diagram illustrating performing proximity correction, according to an exemplary embodiment of the present invention.

FIG. 6 is a diagram illustrating performing proximity correction, according to an exemplary embodiment of the present invention. In accordance with an embodiment of the present invention, spatial proximity is a factor when determining an outlier lesion. Each feature distance $d\_\{m,n\}_f$ is weighted by the spatial distance between the lesions as follows in equation (4):

$$sd\_\{m,n\}f = w_s * d\_\{m,n\}_f \quad (4)$$

where $w_s$ denotes the weight due to proximity.

The weight factor $w_s$ can be obtained from a pre-defined function such as a suitable monotonically decreasing function, such as an exponentially decaying function as follows in equation (5):

$$w_s = \exp(-a * \text{distance}) \quad (5)$$

where distance is the spatial distance between two lesions and a is a suitably chosen decay parameter. The exponential function can be replaced by another function such as, but not necessarily limited to, a piecewise linear function denoting that lesions within a certain distance will have the same weight. The weight factor can further relate to body sites such that a feature difference between lesions from the same body site has more influence than differences from another lesion from a different body site. The weight factor can also be prefixed in a suitable form, such as a look-up table. The weight factor can also be learned from data using machine learning techniques. Furthermore, the weight factor can be modified for each feature separately. This may be necessary where some features may be used in a global context.

Referring to FIG. 6, in a non-limiting example, diagram 602 illustrates distances between lesions 1, 2, and 3 prior to proximity correction. At this point, lesion 1 may be decided as an outlier. However, because of its spatial distance from the other 2 lesions, assuming that a feature difference between lesions from the same body site has more influence than differences from another lesion from a different body site, the large spatial distance between lesion 1 and lesions 2 and 3 leads to the conclusion that lesion 1, which is on a different body site, is not an outlier. As a result, as can be seen in diagram 604, proximity correction adjusts the distances between lesion 1 and lesions 2 and 3. After the adjustment, lesion 1 is grouped as similar to lesions 2 and 3, and is not determined to be an outlier.

The distance between two lesions can be corrected by different weights as shown below in equation (6):

$$cd\_\{m,n\}_f = w_s * w_{\{i,f\}} * d\_\{m,n\}_f \quad (6)$$

where $cd\_\{m,n\}_f$ denotes the difference between m-th and n-th lesions in the feature space of f when both the spatial and importance factors are considered. The same or similar result can be achieved through look-up tables or other techniques.

Corrected distances can be calculated by using machine learning fusion technique such as Bayesian models, taking into account weights and other parameters such as, but not necessarily limited to, anatomical features and dermoscopy patterns. In addition, the system, including the feature selection/weighting component 340, can learn and adjust weights based on feedback from users.

The detection engine 206 further includes a feature combination component 350, which, based on the output of the feature selection/weighting component 340, combines the results of the determinations of the extraction modules 320 and 330 to calculate distances between pairs of lesions across all features. For example, referring to FIG. 7, in diagram 710, distances of any two lesions across all feature spaces (in this diagram, two example features) are combined to calculate an overall distance between the two lesions. For example, a distance between lesion 1 and 2 is calculated in connection with a first feature ($d\_\{1,2\}$ (feature 1) 713) and in connection with a second feature ($d\_\{1,2\}$(feature 2) 714), and combined to determine an overall distance ($d\_\{1,2\}$ 715) between lesion 1 and 2.

Figure 7:
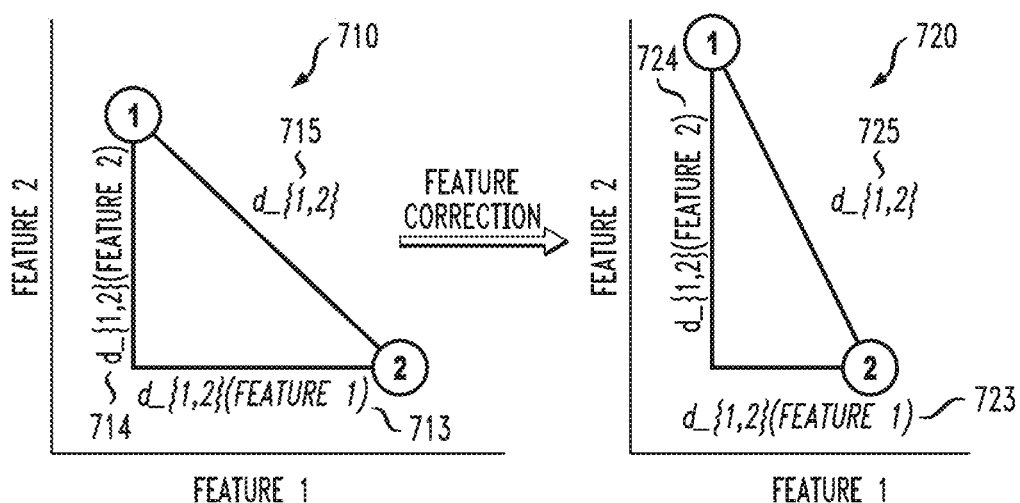
FIG. 7 is a diagram illustrating processing for calculating feature distance between lesions and performing feature correction, according to an exemplary embodiment of the present invention.

By way of non-limiting example, the overall distance between lesions 1 and 2, where the features are contour and histogram, can be represented by the following equation (7):

$$d\_\{1,2\} = \text{sqrt}(d\_\{1,2\}(\text{hist})^{}2 + d\_\{1,2\}(\text{contour})^{}2) \quad (7)$$

where $d\_\{1,2\}$(hist) refers to the distance between lesion 1 and 2 in the histogram feature space, and $d\_\{1,2\}$(contour) refers to the distance between lesion 1 and 2 in the contour feature space. As shown in FIG. 7, based on the weights assigned by the feature selection/weighting component 340, a corrected overall distance 725 in diagram 720 is calculated based on a weighted distance 723 between lesion 1 and 2 in connection with a first feature and a weighted distance 724 in connection with a second feature.

By way of non-limiting example, the corrected overall distance 725 between lesions 1 and 2, where the features are contour and histogram, can be represented by the following equation (8):

$$d\_\{1,2\} = \text{sqrt}(f(w\_\text{hist}, d\_\{1,2\}(\text{hist}))^2 + f(w\_\text{contour}, d\_\{1,2\}(\text{contour}))^2) \quad (8)$$

where w_hist refers to a weight given to the distance between lesion 1 and 2 in the histogram feature space, and w_contour refers to a weight given to the distance between lesion 1 and 2 in the contour feature space.

In general, the distance between lesions m and n across all features, can be calculated as in equation (9) below:

$$d\_\{m,n\}=\text{sqrt}(cd\_\{m,1\}_f)^2+(cd\_\{m,2\}_f)^2+ \ldots +(cd\_\{m,M\}_f)^2) \quad (9)$$

where M=total number of lesions.

According to embodiments of the present invention, weights can be fixed based on the input of experts in the relevant field, and/or learned from data using, for example, machine learning techniques. As can be seen from a comparison of diagram 710 and 720 in FIG. 7, feature 2 (e.g., contour) difference is more important than feature 1 (e.g., histogram) difference, such that feature importance weights amplify the distance between these 2 lesions in the feature 2 axis suppressing the distance in the feature 1 axis, resulting in the corrected overall distance 725 between lesions 1 and 2.

The embodiments of the present invention are not limited to calculating distances of lesions across two feature spaces as shown, and may calculate the distances across any number of feature spaces greater or less than 2, and combine the calculated distances to determine an overall distance between any two lesions.

The detection engine 206 further includes an outlier determination component 360, which, based on the output of the feature combination component 350, including the overall pairwise distances between lesions, determines an outlier lesion(s) of a group of lesions. For example, referring to diagram 800 of FIG. 8, the outlier determination component 360 can determine an outlier lesion (e.g., ugly duckling) by using a representative distance method.

The representative distance of a specific lesion m from all the other lesions is given by a function shown in equation (10) below:

$$d\_\{m\}=\text{func}(d\_\{m,n\}) \quad (10)$$

The specific format of the funs ( ) can be, but is not necessarily limited to, average, median and min.

Figure 8:
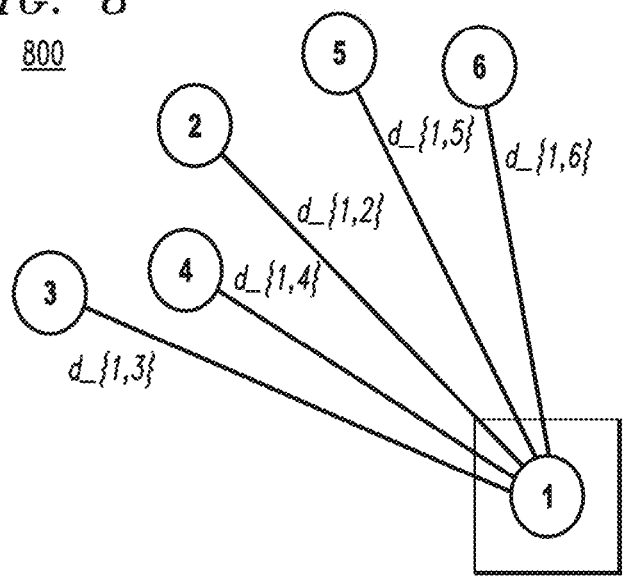
FIG. 8 is a diagram illustrating outlier detection by using a representative distance method, according to an exemplary embodiment of the present invention.

For example, referring to FIG. 8, assuming six lesions, using d_{1,2}, d_{1,3}, d_{1,4}, d_{1,5}, d_{1,6} from feature combination component 350 determined across all feature spaces, the outlier determination component 360 determines d_{1} according to the following equation (11):

$$d\_\{1\}=\min(d\_\{1,2\},d\_\{1,3\},d\_\{1,4\},d\_\{1,5\},d\_\{1,6\}) \quad (11)$$

Similarly, d_{2}, d_{3}, . . . d{6} are also calculated by outlier determination component 360 in accordance with the principle of equation (11). For example, d_min(d_{2,1}, d_{2,3}, d_{2,4}, d_{2,5}, d_{2,6}), d_{3}=min(d_{3,1}, d_{3,2}, d_{3,4}, d_{3,5}, d_{3,6}), etc.

As shown by diagram 800, d_{1} in this case is the maximum of d_{1}, d_{2}, d_{3}, . . . d{6}, where the remaining distances d_{2}, d_{3}, . . . , d{6} are clustered around a small space. Therefore, in this example, lesion 1 will be declared as the outlier lesion. Alternatively, a statistical analysis on all the distances to detect an outlier can also identify the outlier (e.g., ugly duckling) lesion.

In general, the outlier lesion (e.g., ugly duckling) can be determined according to the following equation (12):

$$\text{Outlier}=\arg\max\_m\{d\_m\} \quad (12)$$

In other embodiments instead of "maximum", other outlier detection methods can be applied if there are a sufficient number of lesions available for analysis. Finding the lesion with the maximum distance to others is based on the assumption that there is only one outlier lesion, which is not always the case. For example, there might be no outlier lesion, or more than one outlier lesion exists at a particular site on a patient's body. Thus, other outlier detection methods, the system can evaluate if there is an outlier and, if so, identify which lesions are the outliers and the number of outliers. Outlier detection parameters can be adjusted based on information such as, but not necessarily limited to, site, number of moles, patient age, and gender.

The detection engine 206 further includes a signature component 370, which, based on the outputs of the feature combination component 350 and the outlier determination component 360, determines a lesion signature for each respective patient. In accordance with an embodiment of the present invention, k-means clustering can be used to determine a lesion signature for a patient based on analysis of multiple lesion images taken from the patient. The resulting signature can be tied to conclusions about a patient's condition, diagnosis and/or prognosis based on conditions, diagnoses and/or prognoses of patients with similar lesion signatures. K-means clustering can be used for the classification of different lesion signatures.

Figure 9:
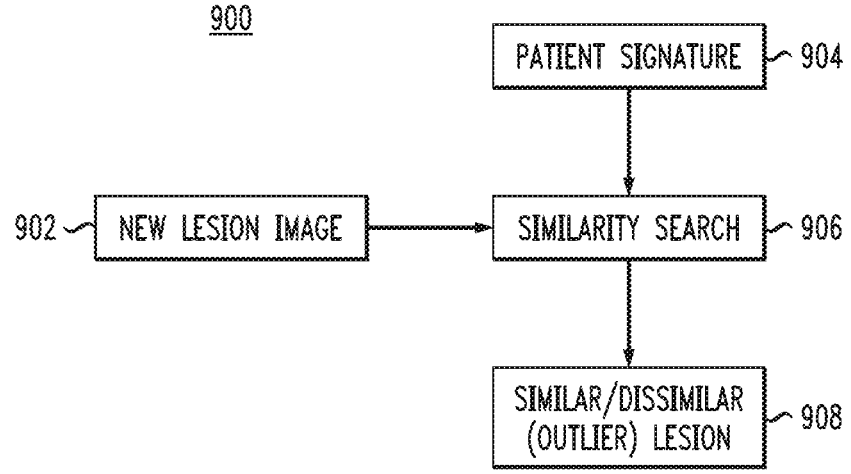
FIG. 9 is a diagram illustrating processing to determine an outlier lesion based on a patient signature, according to an exemplary embodiment of the present invention.

Referring, for example, to FIG. 9, processing to determine whether a new lesion is an outlier lesion can be based on a patient signature, according to an exemplary embodiment of the present invention. Although not shown in FIG. 3, referring to FIG. 9, the detection engine 206 may further include a similarity search component 906 which can access a particular patient's lesion signature 904 from the database 205, or the signature generation component 370. The similarity search component 906 compares the patient's lesion signature 904 to a newly acquired lesion image 902 from that patient, and determines, based on the comparison, whether the lesion in the lesion image is an outlier lesion (block 908) based on the similarity/dissimilarity to the signature 904. The elements of a lesion signature that may be compared include, for example, shape and texture features, which can be compared using, for example, visual similarity matching algorithms. For example, color histograms and local binary pattern (LBP) histograms can be compared. Other examples of algorithms for finding similarity of images that the embodiments of the present invention may utilize include, but are not necessarily limited to, bag of features algorithms (e.g., Fisher vector), sparse coding and auto encoder algorithms (e.g., deep convolution auto encoders or fully connected auto encoders).

Embodiments of the present invention use lesion similarity methodologies described herein to find patients that are similar to each other based on their lesion signatures, where signature can refer to overall patterns of an individual's lesions throughout their body. According to an embodiment of the present invention, a digital signature is an augmented and/or generated image, which visually describes overall properties of patient lesions. Thus, each signature can be visually compared with actual lesion images or other patient signatures.

Figure 10:
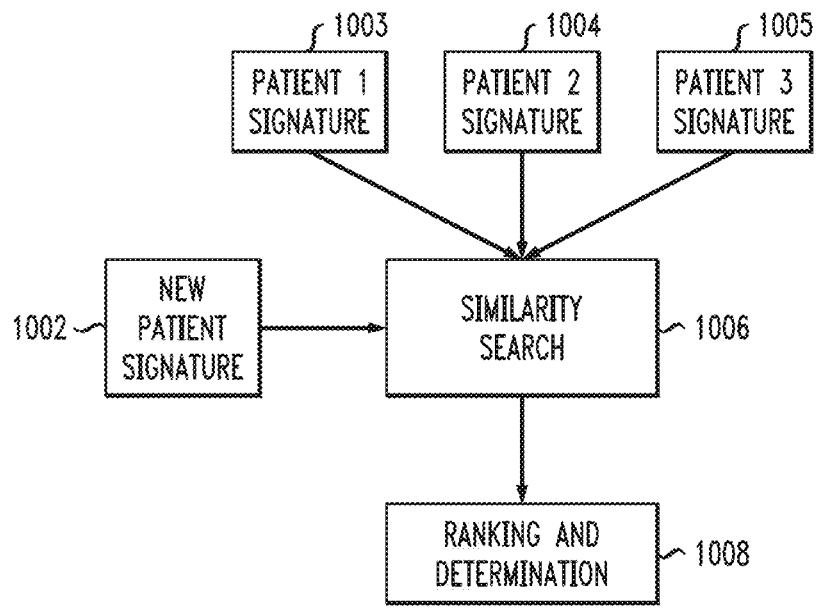
FIG. 10 is a diagram illustrating processing to determine similarity between patient signatures, according to an exemplary embodiment of the present invention.

Referring, for example, to FIG. 10, processing is performed to determine similarity between patient signatures, according to an exemplary embodiment of the present invention. Although not shown in FIG. 3, referring to FIG. 10, the detection engine 206 may further include a similarity search component 1006 which can access lesion signatures 1003, 1004 and 1005 of a plurality of patients from the database 205, or the signature generation component 370. The similarity search component 1006 compares the patients' lesion signatures 1003, 1004 and 1005 to a lesion signature of a new patient 1002, and determines, based on the comparison, whether the new patient's signature 1002 is similar the lesion signatures 1003, 1004 and 1005. A ranking and determination module 1008 determines the degree of similarity between the new patient's signature 1002 and each of the lesion signatures 1003, 1004 and 1005, and ranks the lesion signatures 1003, 1004 and 1005 according to the similarity to the new patient's signature 1002. The new patient's signature 1002 can be tied to conclusions about new patient's condition, diagnosis and/or prognosis based on conditions, diagnoses and/or prognoses of the patient with the closest of the signatures 1003, 1004 and 1005.

Figure 4A:
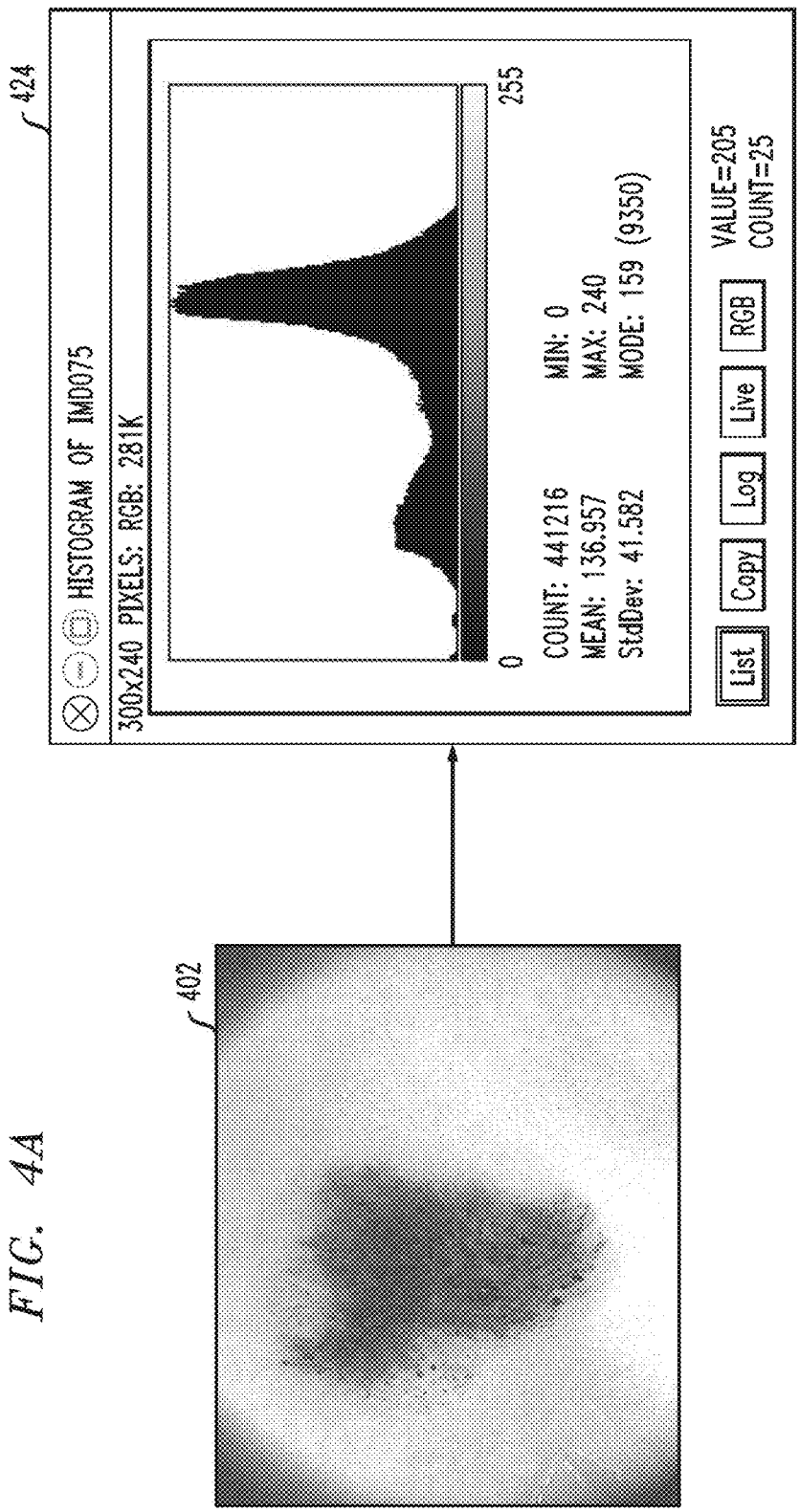
FIGS. 4A and 4B are diagrams illustrating processing for extraction of low-level and clinical features, respectively, from lesion images, according to an exemplary embodiment of the present invention.
Figure 4B:
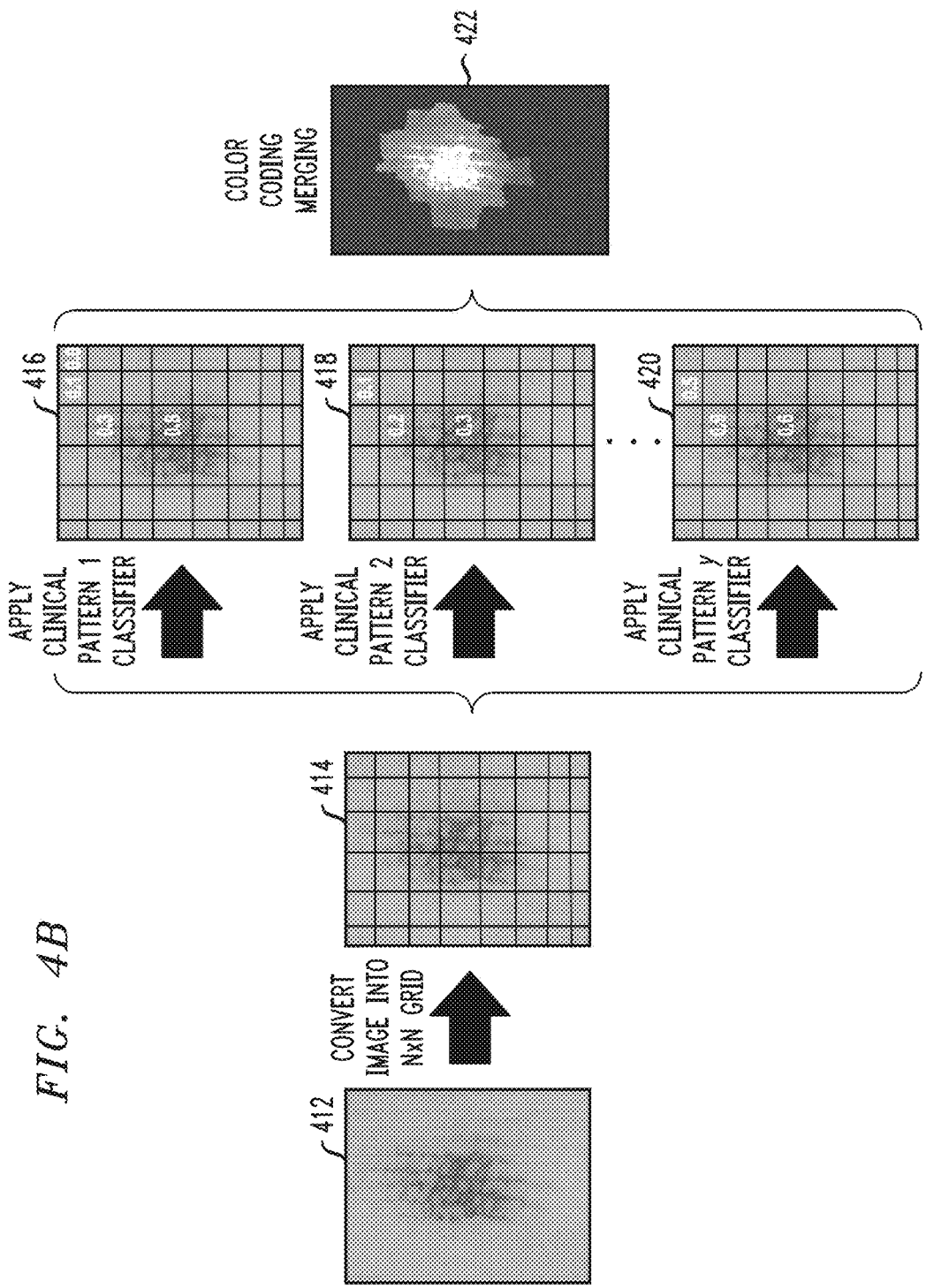

FIGS. 4A and 4B are diagrams illustrating processing for extraction of low-level and clinical features, respectively, from lesion images, according to an exemplary embodiment of the present invention. Referring to FIG. 4A, a low-level image feature, in this case a histogram 424, is electronically extracted from the lesion image 402. The histogram 424 can be a color histogram showing a representation of the distribution of colors in the lesion image 402. To build a color histogram, the number of pixels of each color (or intensity of pixels in grayscale images) in the image is calculated and then partitioned into N bins. The number of pixels in each bin represents the frequency. In accordance with an embodiment of the present invention, the low-level feature extraction module 320 digitally transforms the lesion image 402 into a histogram, such as, for example, color histogram 424, which can be output to a user device, via, for example, a network.

Referring to FIG. 4B, for clinical features, a mechanism to extract clinical features to build a digital signature is as follows. In accordance with an embodiment of the present invention, clinical feature extraction module 330 converts each lesion image (e.g., image 412) into a matrix 414 (e.g., N×N matrix, P×N matrix), which is passed to all clinical pattern classifiers individually (e.g., globules, streak, network, etc) so that each box of the matrix can be marked with a probability of having those dermoscopy/clinical features. For example, referring to FIG. 4B, upon application of clinical pattern classifiers 1, 2, ... y, matrices 416, 418 and 420 marking boxes with a probability of having those corresponding clinical features are formed. For example, the numbers in the boxes of the matrices, such as 0.0, 0.1, 0.2, 0.3, 0.5, 0.6, 0.8 and 0.9, respectively indicate 0%, 10%, 20%, 30%, 50%, 60% 80% and 90% matches with the corresponding clinical pattern in that particular location. In other words, the lesions are evaluated based on different aspects, so that based on clinical features, shapes, such as, for example, circles, dots, and/or lines are identified. Each analysis based on a respective clinical pattern classifier gives a descriptive signature of the lesion for example, the lesion in image 412) from a different aspect, which collectively is the lesion signature. In accordance with an embodiment of the present invention, the clinical feature extraction module 330 digitally transforms lesion images (e.g., lesion image 412) into matrices, where matrix boxes are marked with a probability of having the clinical features. These matrices can be output to a user device, via, for example, a network.

Using color coding and merging the matches with the corresponding clinical patterns, the original image 412 is digitally transformed into a clinical based image representation 422, which represents structural properties of the lesion, including, for example, the density, spread, and type of dermoscopy features in the clinical image. Then, in accordance with an embodiment of the present invention, scale/rotation invariant feature extraction methods such as, for example, scale-invariant feature transform (SIFT), are used to convert the heatmap image 422 to a feature vector. In accordance with an embodiment of the present invention, the clinical based image representation 422 can be output to a user device, via, for example, a network.

All extracted features can be combined by adding feature vector in an M dimensional feature space. According to an embodiment, v denotes the feature extracted from the m-th lesion, where f is the description of the feature (f=color histogram, dermoscopic pattern, etc.)

Figure 5:
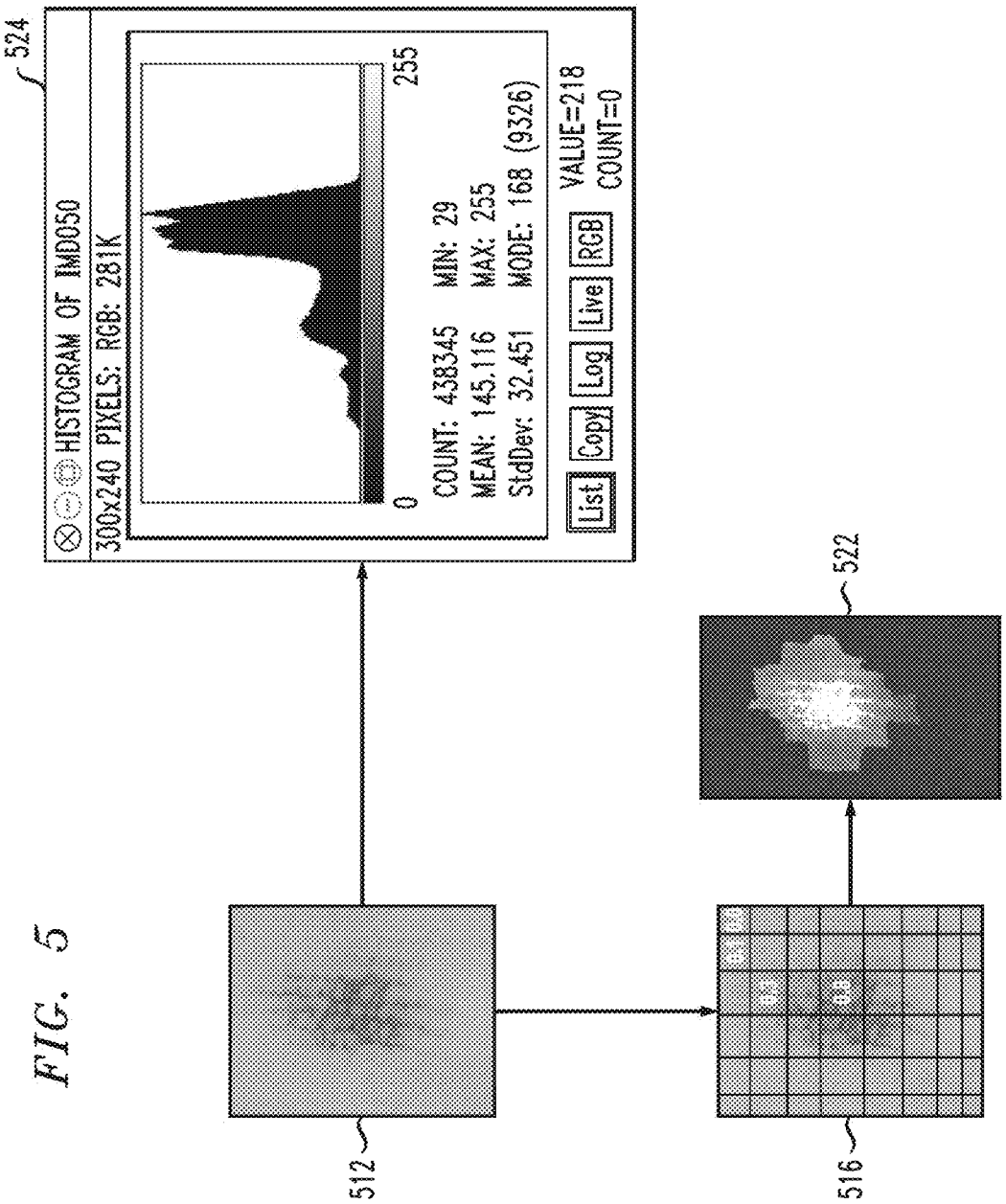
FIG. 5 is a diagram illustrating processing for extraction of low-level and clinical features, from a lesion image, according to an exemplary embodiment of the present invention.

FIG. 5 is a diagram illustrating processing for extraction of low-level and clinical features, from a lesion image, according to an exemplary embodiment of the present invention. Referring to FIG. 5, low-level features are extracted from a lesion image 512 to form histogram 524. As described in connection with FIG. 4B, lesion image 512 is converted into a matrix (e.g., N×N matrix), which is passed to a clinical pattern classifier so that each box of the matrix can be marked as in 516 with a probability of having the clinical feature. Then, using color coding and merging the matches with the corresponding clinical patterns, the original image 512 is digitally converted into a clinical based image representation 522, showing the probability of the presence of clinical features in the grids of the lesion image.

As used herein, term "real-time" refers to output within strict time constraints. Real-time output can be understood to be instantaneous or in the order of milliseconds or microseconds. Of course, it should be understood that depending on the particular temporal nature of the system in which an embodiment of the invention is implemented, other appropriate timescales that provide approximately contemporaneous performance and output can be achieved. In accordance with embodiments of the present invention, a determination of one or more outlier lesions and outputting the result to an end user can be performed in real-time upon capturing one or more lesion images for a patient 203 and transmitting the one or more lesion images to the detection engine 206 for analysis. In accordance with an embodiment of the present invention, a practitioner can receive an automated alert transmitted via, for example, a communication network, that there has been a determination of one or more outlier lesions, along with the ability to view the determination results, including, for example, histograms, and clinical based image representations.

Figure 11:
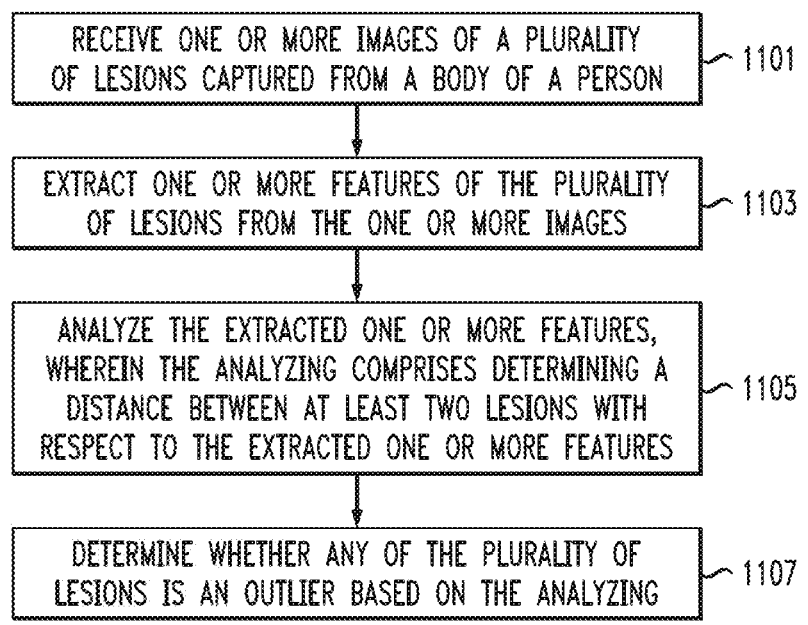
FIG. 11 is a flow diagram of a process for identifying an outlier lesion, according to an exemplary embodiment of the invention.

FIG. 11 is a flow diagram of a process for identifying an outlier lesion according to an exemplary embodiment of the invention. Referring to FIG. 11, the process 1100 includes, at block 1101, receiving one or more images of a plurality of lesions captured from a body of a person. For example, referring back to FIG. 2, the images can be captured from a patient 203 using a capture device 204 and received at a detection engine 206.

The process 1100 further includes at block 1103, extracting one or more features of the plurality of lesions from the one or more images. Image processing can be used to extract the one or more features, which can include; for example, low-level features comprising at least one visual feature, such as color, which can provide the basis for generation of a histogram. The features can also include, for example, clinical features such as lesion size, lesion shape, lesion symmetry, lesion asymmetry, lesion boundaries and lesion color. In accordance with an embodiment of the present invention, as discussed herein in connection with FIG. 4B, for example, the extracting can include converting an image of a lesion into an N×N matrix, quantifying an amount of correspondence with a clinical feature at one or more locations in the matrix, converting the image of the lesion into a clinical based image representation representing one or more structural properties of the lesion, and converting the clinical based image representation into a feature vector.

The process 1100 also includes, at block 1105, analyzing the extracted one or more features, wherein the analyzing comprises determining a distance between at least two lesions with respect to the extracted one or more features. Determining the distance between the at least two lesions can include calculating a Euclidean distance and/or a KL divergence measure.

The process 1100 also includes, at block 1107, determining whether any of the plurality of lesions is an outlier based on the analyzing, which can be performed using a representative distance method. The process may also include creating a lesion signature for the person based on the analyzing.

The process can further include applying a weight to the distance between the at least two lesions. The weight can be based on a proximity of the at least two lesions with respect to each other and/or on an importance of the extracted one or more features. The importance of the extracted one or more features can be determined by using at least one machine learning technique.

In accordance with an embodiment of the present invention, the one or more images and the extracting of the one or more features from the one or more images are associated with a first time. In addition, the process can further include receiving one or more additional images of the plurality of lesions captured from the body of the person, and extracting the one or more features of the plurality of lesions from the one or more additional images. The one or more additional images and the extracting of the one or more features from the one or more additional images can be associated with a second time, and a change in the extracted one or more features between the first time and the second time can be determined.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computereadable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
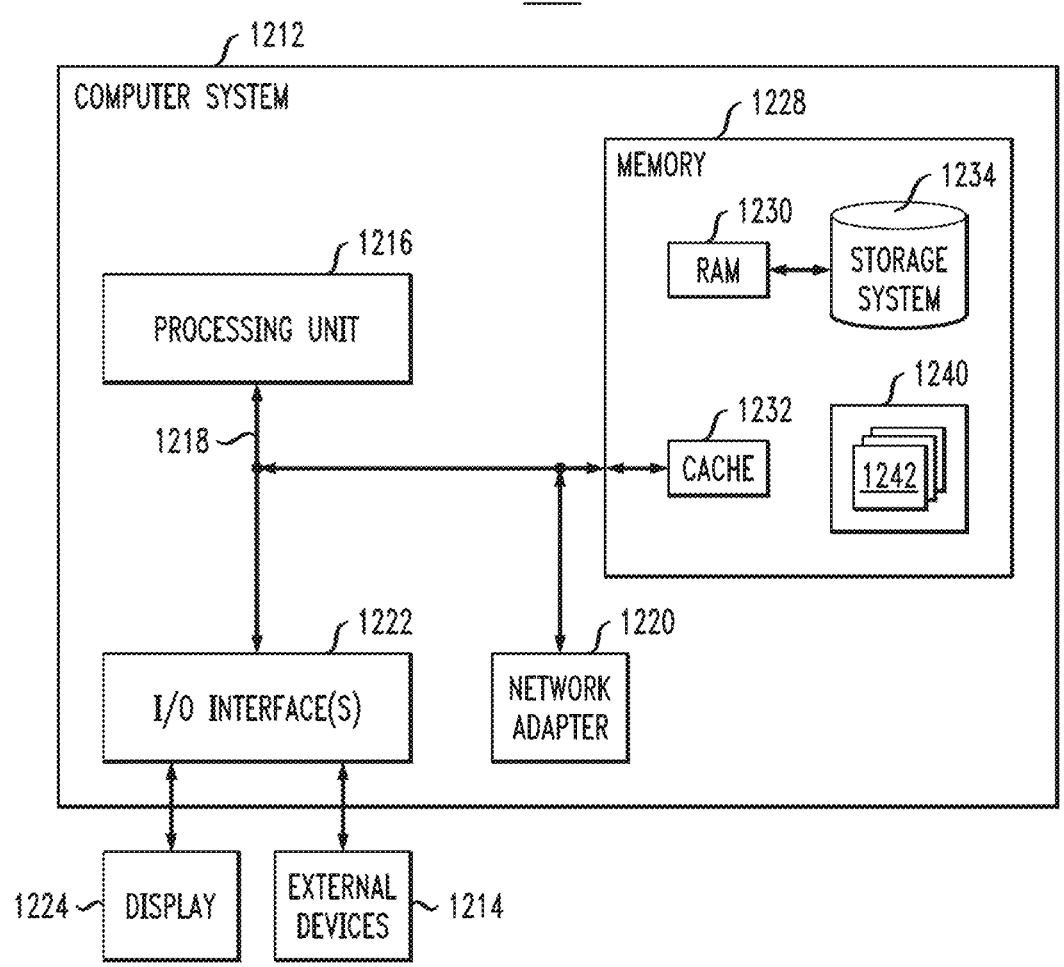
FIG. 12 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 12, in a computing node 1210 there is a computer system/server 1212, which is operational with numerous other general purpose or special purpose computing system environments or configurations. Examples of well-known computing systems, environments, and/or configurations that may be suitable for use with computer system/server 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the n al context of computer system executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1212 in computing node 1210 is shown in the form of a general-purpose computing device. The components of computer system/server 1212 may include, but are not limited to, one or more processors or processing units 1216, a system memory 1228, and a bus 1218 that couples various system components including system memory 1228 to processor 1216.

The bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1212 typically includes a variety of computer system readable media. Such media may be any available media that is accessible by computer system/server 1212, and it includes both volatile and non-volatile media, removable and non-removable media.

The system memory 1228 can include computer system readable media in the form of volatile memory, such as random access memory (RAM) 1230 and/or cache memory 1232. The computer system/server 1212 may further include other removable/non-re movable, volatile/nonvolatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1218 by one or more data media interfaces. As depicted and described herein, the memory 1228 may include at least one program product having a set (e.g., at least one) of program modules that are configured to carry out the functions of embodiments of the invention. A program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment Program modules 1242 generally carry out the functions and/or methodologies of embodiments of the invention as described herein.

Computer system/server 1212 may also communicate with one or more external devices 1214 such as a keyboard, a pointing device, a display 1224, etc., one or more devices that enable a user to interact with computer system/server 1212, and/or any devices (e.g., network card, modem, etc.) that enable computer system/server 1212 to communicate with one or more other computing devices. Such communication can occur via Input/Output (I/O) interfaces 1222. Still yet, computer system/server 1212 can communicate with one or more networks such as a local area network (LAN), a general wide area network (WAN), and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party, and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computing node 1210 in FIG. 12 can be an example of a cloud computing node. Computing node 1210 is only one example of a suitable cloud computing node and is not intended to suggest any limitation as to the scope of use or functionality of embodiments of the invention described herein. Regardless, computing node 1210 is capable of being implemented and/or performing any of the functionality set forth hereinabove. It is also to be understood that computing node 1210 is not necessarily a cloud computing node.

Figure 13:
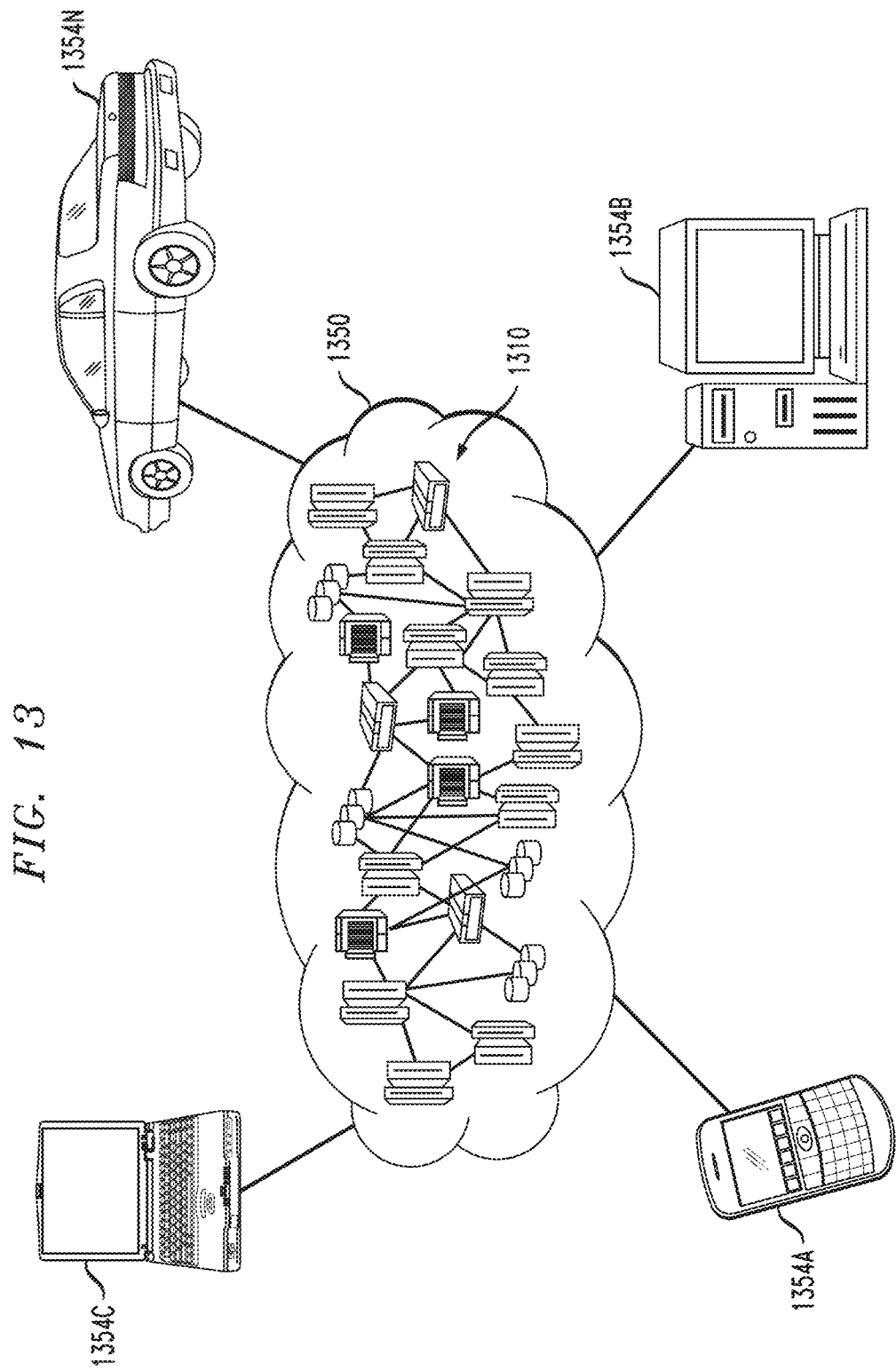
FIG. 13 depicts a cloud computing environment, according to an exemplary embodiment of the present invention.

Referring now to FIG. 13, illustrative cloud computing environment 1350 is depicted. As shown, cloud computing environment 1350 comprises one or more cloud computing nodes 1310 with which local computing devices used by cloud consumers, such as, for example, a wearable device (not explicitly shown), a personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
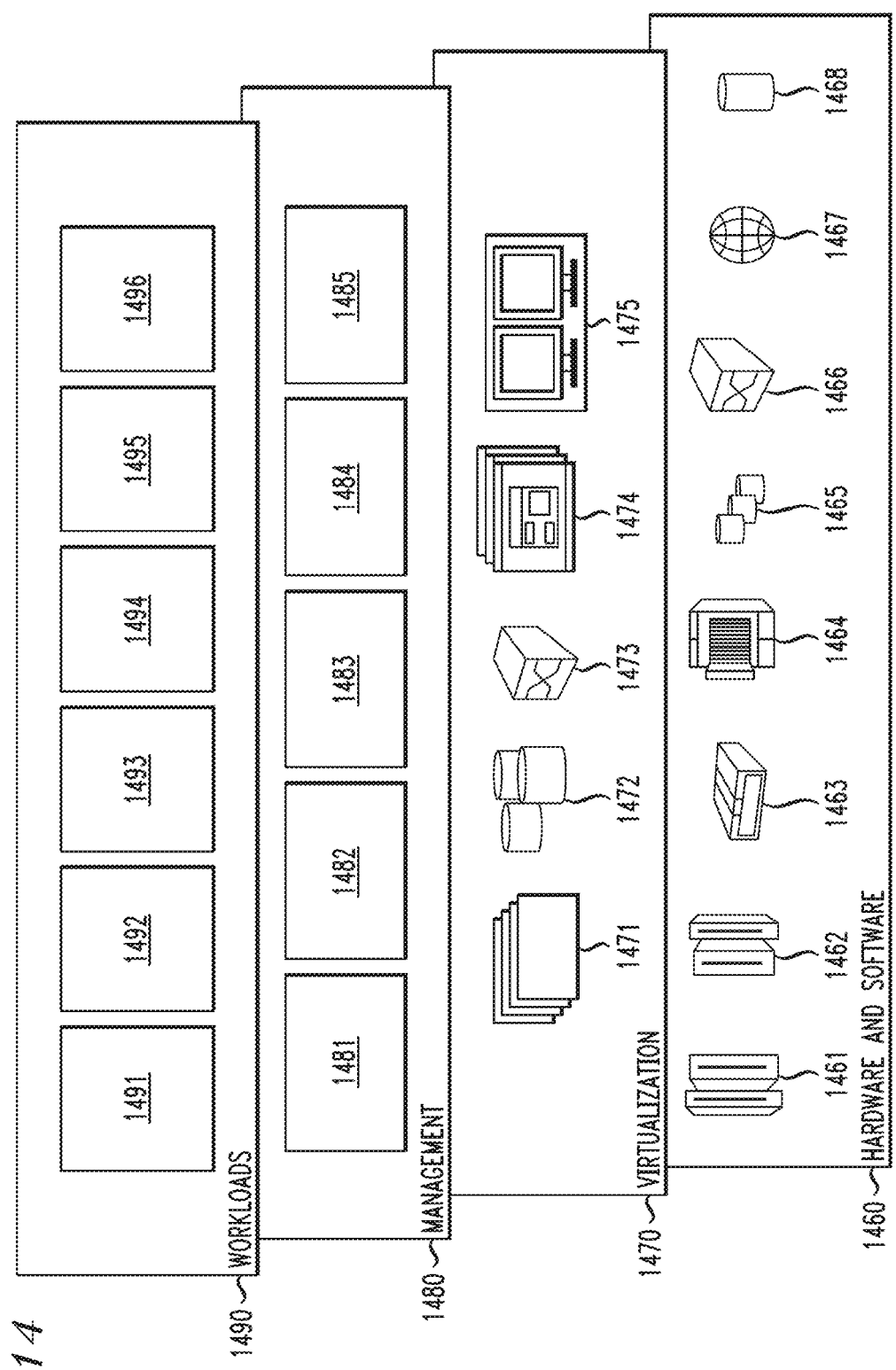
FIG. 14 depicts abstraction model layers, according to an exemplary embodiment of the invention.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and outlier lesion detection and determination 1496, which may implement the functionality described above with respect to FIGS. 1-13.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for image analysis, comprising:
   receiving one or more images of a plurality of lesions captured from a body of a person;
   extracting one or more features of the plurality of lesions from the one or more images;
   analyzing the extracted one or more features;
   wherein the analyzing comprises determining a distance between at least two lesions with respect to the extracted one or more features; and
   determining whether any of the plurality of lesions is an outlier based on the analyzing;
   wherein the extracting comprises:
      converting an image of a lesion of the plurality of lesions into a matrix;
      quantifying an amount of correspondence with each of a plurality of clinical features at a plurality of locations in the matrix, wherein the quantifying comprises determining a probability of having each of the plurality of clinical features at the plurality of locations in the matrix; and
      digitally transforming the image of the lesion into a clinical based image representation representing one or more structural properties of the lesion, wherein the digitally transforming comprises merging the quantified amounts of correspondence with each of the plurality of clinical features;
   wherein the method is performed by at least one computer system comprising at least one memory and at least one processor coupled to the memory.

2. The method according to claim 1, wherein the one or more features comprise at least one visual feature, and the method further comprises generating a histogram based on the at least one visual feature.

3. The method according to claim 1, wherein the one or more features comprise at least one clinical feature selected from the group consisting of lesion size, lesion shape, lesion symmetry, lesion asymmetry, lesion boundaries and lesion color.

4. The method according to claim 1, wherein the extracting further comprises converting the clinical based image representation into a feature vector.

5. The method according to claim 1, wherein determining the distance between the at least two lesions comprises calculating at least one of a Euclidean distance and a divergence measure.

6. The method according to claim 1, further comprising applying a weight to the distance between the at least two lesions, wherein the weight is based on a proximity of the at least two lesions with respect to each other.

7. The method according to claim 1, wherein the one or more images and the extracting of the one or more features from the one or more images are associated with a first time, and the method further comprises:
   receiving one or more additional images of the plurality of lesions captured from the body of the person;
   extracting the one or more features of the plurality of lesions from the one or more additional images, wherein the one or more additional images and the extracting of the one or more features from the one or more additional images are associated with a second time; and
   determining a change in the extracted one or more features between the first time and the second time.

8. The method according to claim 1, wherein determining whether any of the plurality of lesions is an outlier is performed using a representative distance method.

9. The method according to claim 1, further comprising creating a lesion signature for the person based on the analyzing.

10. The method according to claim 1, further comprising applying a weight to the distance between the at least two lesions, wherein the weight is based on an importance of the extracted one or more features.

11. The method according to claim 10, wherein the importance of the extracted one or more features is determined by using at least one machine learning technique.

12. A system for image analysis, comprising:
   a memory and at least one processor coupled to the memory, wherein the at least one processor is configured to:

receive one or more images of a plurality of lesions captured from a body of a person;
extract one or more features of the plurality of lesions from the one or more images;
analyze the extracted one or more features;
wherein the analyzing comprises determining a distance between at least two lesions with respect to the extracted one or more features; and
determine whether any of the plurality of lesions is an outlier based on the analyzing;
wherein in performing the extracting the processor is configured to:
 convert an image of a lesion of the plurality of lesions into a matrix;
 quantify an amount of correspondence with each of a plurality of clinical features at a plurality of locations in the matrix, wherein the quantifying comprises determining a probability of having each of the plurality of clinical features at the plurality of locations in the matrix; and
 digitally transform the image of the lesion into a clinical based image representation representing one or more structural properties of the lesion, wherein the digitally transforming comprises merging the quantified amounts of correspondence with each of the plurality of clinical features.

13. The system according to claim 12, wherein the one or more features comprise at least one clinical feature selected from the group consisting of lesion size, lesion shape, lesion symmetry, lesion asymmetry, lesion boundaries and lesion color.

14. The system according to claim 12, wherein in performing the extracting the processor is further configured to:
 convert the clinical based image representation into a feature vector.

15. The system according to claim 12, wherein in determining the distance between the at least two lesions the processor is configured to calculate at least one of a Euclidean distance and a divergence measure.

16. The system according to claim 12, wherein the processor is further configured to apply a weight to the distance between the at least two lesions, wherein the weight is based on a proximity of the at least two lesions with respect to each other.

17. The system according to claim 12, wherein the processor is further configured to apply a weight to the distance between the at least two lesions, wherein the weight is based on an importance of the extracted one or more features.

18. The system according to claim 12, wherein the one or more features comprise at least one visual feature, and the processor is further configured to generate a histogram based on the at least one visual feature.

19. A computer program product for image analysis, the computer program product comprising a computer readable storage medium having program instructions embodied therewith, the program instructions executable by a processor to cause the processor to perform a method comprising:
 receiving one or more images of a plurality of lesions captured from a body of a person;
 extracting one or more features of the plurality of lesions from the one or more images;
 analyzing the extracted one or more features;
 wherein the analyzing comprises determining a distance between at least two lesions with respect to the extracted one or more features; and
 determining whether any of the plurality of lesions is an outlier based on the analyzing;
 wherein the extracting comprises:
  converting an image of a lesion of the plurality of lesions into a matrix;
  quantifying an amount of correspondence with each of a plurality of clinical features at a plurality of locations in the matrix, wherein the quantifying comprises determining a probability of having each of the plurality of clinical features at the plurality of locations in the matrix; and
  digitally transforming the image of the lesion into a clinical based image representation representing one or more structural properties of the lesion, wherein the digitally transforming comprises merging the quantified amounts of correspondence with each of the plurality of clinical features.

* * * * *